(12) United States Patent
Bleidorn

(10) Patent No.: US 12,549,411 B2
(45) Date of Patent: *Feb. 10, 2026

(54) LAN-CONNECTED DEVICE STATUS DETERMINATION BY A BRIDGED GATEWAY

(71) Applicant: Charter Communications Operating, LLC, St. Louis, MO (US)

(72) Inventor: Timothy Bleidorn, Colorado Springs, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 393 days.

This patent is subject to a terminal disclaimer.

(21) Appl. No.: 18/179,589

(22) Filed: Mar. 7, 2023

(65) Prior Publication Data

US 2024/0305503 A1 Sep. 12, 2024

(51) Int. Cl.
*H04L 12/46* (2006.01)
*H04L 12/66* (2006.01)
*H04L 61/5014* (2022.01)

(52) U.S. Cl.
CPC .......... *H04L 12/66* (2013.01); *H04L 12/4641* (2013.01); *H04L 61/5014* (2022.05)

(58) Field of Classification Search
CPC . H04L 12/66; H04L 12/4641; H04L 61/5014; H04L 12/4633
See application file for complete search history.

(56) References Cited

U.S. PATENT DOCUMENTS

| 11,240,098 B2 | 2/2022 | Bleidorn et al. |
| 2013/0215894 A1* | 8/2013 | Maezawa .............. H04L 61/106 370/392 |

OTHER PUBLICATIONS

Author Unknown, "ONAP vCPE Blueprint Overview," 2018, 10 pages.

* cited by examiner

*Primary Examiner* — Cheikh T Ndiaye
(74) *Attorney, Agent, or Firm* — Dority & Manning, P.A.

(57) ABSTRACT

A bridged gateway (BG) coupled to a local area network (LAN) receives a layer 2 frame from a device coupled to the LAN. The BG determines that the layer 2 frame is addressed to a network gateway router that provides layer 3 routing services for the LAN. The BG forwards, to the network gateway router via a layer 2 tunnel, the layer 2 frame. The BG starts a timer that corresponds to the device. The BG determines that the timer has elapsed and no response to the layer 2 frame has been received by the BG. In response to determining that the timer has elapsed, the BG sends to a destination, an alert, the alert indicating that the device has not received a response to a message destined for the network gateway router.

20 Claims, 3 Drawing Sheets

LAN-CONNECTED DEVICE STATUS DETERMINATION BY A BRIDGED GATEWAY

BACKGROUND

Devices connected to a local area network (LAN) typically communicate with other devices connected to the same LAN via layer 2 communication protocols, and with devices connected to another LAN via layer 3 communication protocols. Layer 3 protocol communications are facilitated via a gateway router that is typically physically connected to the same LAN as the sending device and also connected to another network.

SUMMARY

The embodiments disclosed herein implement LAN-connected device status determination by a bridged gateway.

In one embodiment a method is provided. The method includes receiving, by a bridged gateway (BG) coupled to a local area network (LAN), a first layer 2 frame from a first device coupled to the LAN. The method further includes determining, by the BG, that the first layer 2 frame is addressed to a network gateway router that provides layer 3 routing services for the LAN. The method further includes forwarding, by the BG to the network gateway router via a layer 2 tunnel, the first layer 2 frame. The method further includes starting, by the BG, a first timer that corresponds to the first device. The method further includes determining, by the BG, that the first timer has elapsed and no response to the first layer 2 frame has been received by the BG. The method further includes in response to determining that the first timer has elapsed, sending, by the BG to a destination, an alert, the alert indicating that the first device has not received a response to a message destined for the network gateway router.

In another embodiment a bridged gateway is provided. The bridged gateway includes a memory, and a processor device coupled to the memory. The processor device is configured to receive a first layer 2 frame from a first device coupled to a local area network (LAN). The processor device is configured to determine that the first layer 2 frame is addressed to a network gateway router that provides layer 3 routing services for the LAN. The processor device is configured to forward, to the network gateway router via a layer 2 tunnel, the first layer 2 frame. The processor device is configured to start a first timer that corresponds to the first device. The processor device is configured to determine that the first timer has elapsed and no response to the first layer 2 frame has been received by the BG. The processor device is configured to, in response to determining that the first timer has elapsed, send, to a destination, an alert, the alert indicating that the first device has not received a response to a message destined for the network gateway router.

In another embodiment a non-transitory computer-readable storage medium is provided. The non-transitory computer-readable storage medium includes executable instructions configured to cause a processor device to receive a first layer 2 frame from a first device coupled to a local area network (LAN). The instructions are further configured to cause the processor device to determine that the first layer 2 frame is addressed to a network gateway router that provides layer 3 routing services for the LAN. The instructions are further configured to cause the processor device to forward, to the network gateway router via a layer 2 tunnel, the first layer 2 frame. The instructions are further configured to cause the processor device to start a first timer that corresponds to the first device. The instructions are further configured to cause the processor device to determine that the first timer has elapsed and no response to the first layer 2 frame has been received by the BG. The instructions are further configured to cause the processor device to, in response to determining that the first timer has elapsed, send, to a destination, an alert, the alert indicating that the first device has not received a response to a message destined for the network gateway router.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
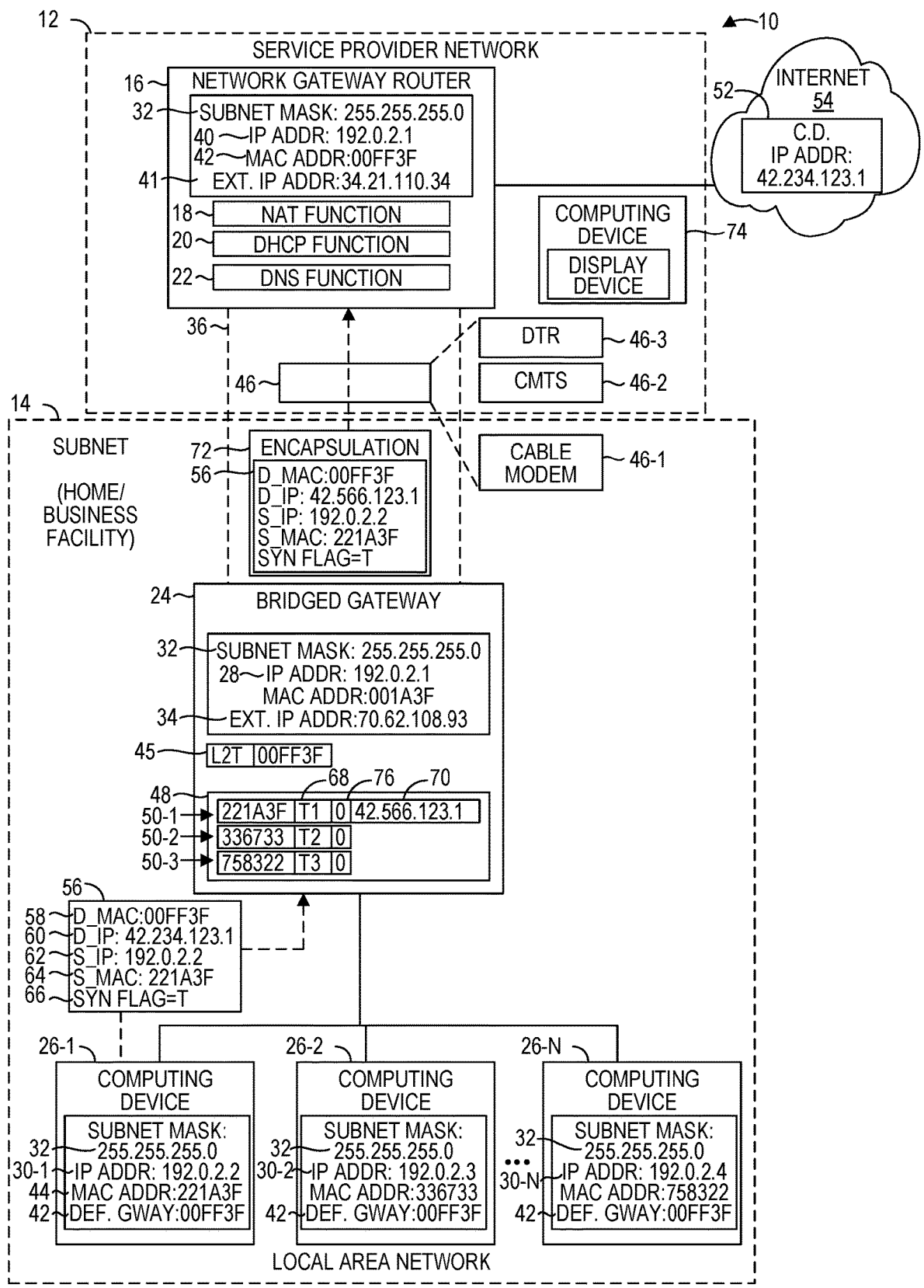
FIG. 1 is a block diagram of a system for facilitating LAN-connected device status determination by a bridged gateway according to some embodiments.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Devices connected to a local area network (LAN) typically communicate with other devices connected to the same LAN via layer 2 communication protocols, and with devices connected to another LAN via layer 3 communication protocols. Layer 3 protocol communications are facilitated via a gateway router that is typically physically connected to the same LAN as the sending device and also connected to another network.

Service providers that provide a customer premises with Internet access sometimes provide the customer with a gateway router that is connected to the LAN of the customer, and also connected to the service provider's network. The gateway router implements traditional gateway router services, such as dynamic host configuration protocol (DHCP) services for providing network-connected computing devices with internet protocol (IP) addresses as needed, network address translation (NAT) services to translate private IP addresses associated with a subnetwork to a public IP address, Domain Name System (DNS) services for translating a domain name to an IP address, and the like.

A service provider may desire to provide gateway functionality from a location within the service provider's network rather than from the customer premises. Moving the gateway functionality from the subscriber's physical location to a network gateway router at a service provider's location may make it easier to support customer issues and reduce the need to send a technician to a customer premises such as a home or business.

The terms subnetwork, or subnet, will be treated synonymously herein, and refer to a data communications network, often but not necessarily an Ethernet network, wherein each connected computing device on the subnet has an IP address that has the same network address, and which utilizes the same subnet mask to determine whether other computing devices are on the same network or are on a different network. Such computing devices may be referred to herein as being "on" or "connected to" or "coupled to" the same subnet. Computing devices on the same subnet can communicate with one another, typically via layer 2 addressing, such as a media access control (MAC) address, without the need for a router. A LAN is an example of a subnet.

Since a network gateway router is not physically connected to the LAN, to implement a network gateway router in a manner that is transparent to devices connected to the LAN, a device on the LAN, such as a bridged gateway (BG), may establish a layer 2 tunnel with the network gateway router, and send layer 2 frames generated by devices on the LAN to the network gateway router, and send frames generated by the network gateway router to devices on the LAN. This is done transparently such that devices on the LAN are unaware that the gateway router is not actually directly connected to the same physical network as the devices on the LAN.

If a problem occurs upstream of the BG such that layer 2 frames sent over the layer 2 tunnel to the network gateway router are not responded to, it would be desirable for the BG to be able to inform the service provider that a problem exists. Providing such a notification may allow the service provider to fix the problem even before the customer becomes aware of the problem, and/or may provide useful information to the service provider that may help the service provider determine the cause of the problem.

The embodiments disclosed herein implement LAN-connected device status determination by a BG. The BG receives a layer 2 frame from a device coupled to the LAN and determines that the layer 2 frame is addressed to a gateway router that provides layer 3 routing services for the LAN. The BG forwards the layer 2 frame to the gateway router via a layer 2 tunnel. The BG starts a timer that corresponds to the device. The BG determines that the timer has elapsed and no response to the layer 2 frame has been received by the BG. The BG, in response to determining that the timer has elapsed and no response to the layer 2 frame has been received, sends an alert that indicates that the device has not received a response from the gateway router. In this manner, the BG is able to monitor and report the status of LAN-connected devices.

FIG. 1 is a block diagram of a system 10 for facilitating LAN-connected device status determination by a bridged gateway according to some embodiments. The system 10 includes a service provider network 12 and a local area network, referred to herein as a local subnetwork (subnet) 14, or a LAN 14, located in a business or home. The service provider network 12 includes a network gateway router 16 (sometimes referred to as a broadband network gateway) that is configured to provide, for the local subnet 14, default gateway router functions, such as, by way of non-limiting example, one or more of a NAT function 18, a DHCP function 20 and a DNS function 22. The network gateway router 16 is physically located in a facility controlled by the respective service provider, and may be located tens, hundreds, or thousands of miles from the local subnet 14. The network gateway router 16 may be a special purpose routing device, or may be implemented via gateway routing functions executing on a conventional computing device. In some embodiments, the network gateway router 16 may comprise a virtual gateway as described in TR-317 Network Enhanced Residential Gateway, available at www.broadband-forum.org/download/TR-317.pdf. In some embodiments the network gateway router 16 may comprise a Broadband Network Gateway (BNG) that implements a plurality of virtual gateways that are respectively associated with different customer subnets.

The local subnet 14 includes a bridged gateway 24 that is coupled to the local subnet 14 via a layer 2 transceiver, such as an Ethernet wired transceiver, a WiFi transceiver, or both. The bridged gateway 24 operates as a transparent tunneling mechanism as will be described in greater detail below. In some embodiments, the bridged gateway 24 may have two modes, a first mode wherein the bridged gateway 24 operates in a tunneling mode, and a second mode wherein, if desired, the bridged gateway 24 operates in a routing mode and serves as a gateway router.

The bridged gateway 24 is communicatively coupled to a plurality of computing devices 26-1-26-N via one or more networking technologies, such as Ethernet, Wi-Fi®, or the like. The bridged gateway 24 and the plurality of computing devices 26-1-26-N are all on the same subnet, and thus each have an IP address 28, 30-1-30-N, respectively, that identifies a same network address, in particular, that of the local subnet 14, and which utilizes the same subnet mask 32 to determine whether another computing device is on the same subnet, or on a different network. The IP addresses 28, 30-1-30-N may be referred to as being "on" the local subnet 14. The bridged gateway 24 may also have an external IP address 34 that is not on the local subnet 14. The bridged gateway 24 may also be configured to be able to provide to the computing devices 26-1-26-N, when in routing mode, default gateway router functions.

The network gateway router 16 has an IP address 40 that is on the local subnet 14 and, in some embodiments, may be the same as the IP address 28 of the bridged gateway 24. The bridged gateway 24 and the network gateway router 16 communicate with one another via a layer 2 tunnel 36 that is implemented via a tunneling protocol. The tunneling protocol may comprise any suitable tunneling protocol; however, in some embodiments, the tunneling protocol comprises a layer 2 tunneling protocol such as, by way of non-limiting example, the generic routing encapsulation (GRE) tunneling protocol. The bridged gateway 24 and the network gateway router 16 may use the external IP address 34 and the external IP address 41, respectively, to establish the layer 2 over layer 3 tunnel.

The network gateway router 16 also utilizes the same subnet mask 32 as the bridged gateway 24 and the computing devices 26-1-26-N. The network gateway router 16 may also have an external IP address 41 that is not on the local subnet 14 and which may be used, for example, for network address translation. The bridged gateway 24, when in tunneling mode, forwards all layer 2 frames on the local subnet 14 that have a destination address of the network gateway router 16, all broadcast layer 2 frames, and layer 2 frames that have a destination address off the local subnet 14, to the network gateway router 16. To the computing devices 26-1-26-N, the network gateway router 16 appears to be directly coupled to the local subnet 14 in the same manner as the computing devices 26-1-26-N. The bridged gateway 24 may maintain a network gateway router MAC address 45 to determine if layer 2 frames are destined for the network gateway router 16.

The computing device 26-1, for example, may address a layer 2 frame using a MAC address 42 (i.e., a layer 2 data link address) of the network gateway router 16 and transmit the layer 2 frame on the local subnet 14. The bridged gateway 24 determines that the layer 2 frame has the MAC address 42 of the network gateway router 16, encapsulates the layer 2 frame in accordance with the tunneling protocol, and forwards the encapsulated layer 2 frame to the network gateway router 16.

The network gateway router 16 may generate a response layer 2 frame, address the response layer 2 frame to a MAC address 44 of the computing device 26-1, encapsulate the response layer 2 frame in accordance with the tunneling protocol, and send the encapsulated layer 2 frame to the bridged gateway 24 via the tunnel 36. The bridged gateway 24 receives the encapsulated response layer 2 frame, extracts the response layer 2 frame, and forwards the response layer 2 frame to the computing device 26-1. Thus, each of the computing devices 26-1-26-N, the bridged gateway 24 and the network gateway router 16 have layer 2 connectivity to one another and can communicate with one another utilizing layer 2 MAC addresses.

The tunnel 36 may traverse a communications path that includes one or more devices 46. In this example, the devices 46 include a cable modem 46-1, a cable modem termination system (CMTS) 46-2, and a distribution router (DTR) 46-3. In this particular implementation, the cable modem 46-1 is located in the same home or business facility as the bridged gateway 24, and the CMTS 46-2 and DTR 46-3 are located in facilities operated by the respective service provider. In some embodiments, the bridged gateway 24 and the cable modem 46-1 may be a single device.

The bridged gateway 24 may be a learning bridge and maintain a Table 48 in which the bridged gateway 24 stores the MAC addresses of computing devices 26 that transmit layer 2 frames on the subnet 14. In this example, an entry 50-1 contains the MAC address of the computing device 26-1 and indicates that the computing device 26-1 has previously transmitted a layer 2 frame on the subnet 14. An entry 50-2 contains the MAC address of the computing device 26-2 and indicates that the computing device 26-2 has previously transmitted a layer 2 frame on the subnet 14. An entry 50-3 contains the MAC address of the computing device 26-N and indicates that the computing device 26-N has previously transmitted a layer 2 frame on the subnet 14.

The entries 50-1-50-3 may be referred to as entries 50 generally. The entries 50 may include a timer that is set to a predetermined value each time a MAC address is added to the Table 48, or each time a layer 2 frame is received from a MAC address for which an entry 50 already exists. If the timer expires, then the entry 50 may be removed from the Table 48 to ensure that entries 50 are maintained only for active computing devices 26.

With this background, an example of LAN-connected device status determination by the bridged gateway 24 will be discussed. In this example, assume that the computing device 26-1 initiates connection with the local subnet 14. This initiation may comprise, for example, a user physically coupling the computing device 26-1 to a switch of the local subnet 14 via an Ethernet cable, or attempting to join a Wi-Fi® adapter of the local subnet 14 by entering an appropriate password. At the initial time of connection, the computing device 26-1 does not have an IP address on the local subnet 14. The computing device 26-1 generates and transmits a layer 2 frame that comprises a DHCP DHCPDISCOVER message addressed to a broadcast address (e.g., the destination MAC address is set to "FF:FF:FF:FF:FF:FF") to obtain an IP address on the local subnet 14. The bridged gateway 24 receives the layer 2 frame, determines that the layer 2 frame is a broadcast message and not directed to a particular layer 2 MAC address, and thus sends the layer 2 frame to the network gateway router 16 via the tunnel 36 (solely for purposes of brevity, the steps of encapsulation associated with use of the tunnel 36 will not always be discussed herein), as well as to the computing devices 26-2-26-N.

The network gateway router 16 receives the layer 2 frame, and determines that the layer 2 frame comprises the DHCP DHCPDISCOVER message. The DHCP function 20 selects the IP address 30-1 from a pool of available IP addresses of the local subnet 14, and generates a DHCPOFFER response that includes the IP address 30-1 for use by the computing device 26-1, information identifying the network gateway router 16 as the default gateway router for the local subnet 14, including the IP address 40 of the network gateway router 16, and the subnet mask 32. The network gateway router 16 generates a layer 2 frame including the DHCPOFFER response and addresses the layer 2 frame to the computing device 26-1. The network gateway router 16 encapsulates the layer 2 frame using a layer 2 tunnel encapsulation protocol, such as, by way of non-limiting example, GRE, and sends the encapsulated layer 2 frame to the bridged gateway 24.

The bridged gateway 24 receives the encapsulated layer 2 frame, decapsulates the layer 2 frame, and sends the layer 2 frame to the computing device 26-1. The computing device 26-1 receives the response, and stores the IP address 30-1 and the subnet mask 32 of the network gateway router 16. (It is noted that solely for purposes of brevity the DHCP process described herein is a summarized version of the typical four-way handshake sequence involved in obtaining an IP address via a DHCP function.) The computing device 26-1 may then send an Address Resolution Protocol (ARP) request using the IP address 40 to obtain the MAC address 42 of the network gateway router 16.

This process may be repeated for each of the computing devices 26-2-26-N as the computing devices 26-2-26-N connect to the local subnet 14, such that each of the computing devices 26-2-26-N obtains a unique IP address on the local subnet 14, obtains the subnet mask 32 and the IP address 40 of the network gateway router 16, and obtains the MAC address 42 of the network gateway router 16 as the default gateway router.

The computing device 26-1 subsequently desires to establish a connection with a server 52 in the Internet 54 that has an IP address of 42.566.123.1. The computing device 26-1 determines, using the subnet mask 32, that the IP address 42.566.123.1 is not on the local subnet 14, and thus must be forwarded by the network gateway router 16. The computing device 26-1 generates a layer 2 frame 56 that comprises a TCP packet that includes a header that includes a destination MAC address field 58 that identifies the MAC address of the network gateway router 16, a destination IP address field 60 that identifies the IP address of the server 52 (e.g., 42.566.123.1), a source IP address field 62 that identifies the IP address of the computing device 26-1, a source MAC address field 64 that identifies the MAC address of the computing device 26-1, and a synchronize (SYN) flag 66 set to a value of true, and transmits the layer 2 frame onto the local subnet 14. A TCP packet having the SYN flag set to a value of true is the first message in a 3-way handshake used to establish a connection between two computing devices.

The bridged gateway 24 receives the layer 2 frame 56. The bridged gateway 24 analyzes the layer 2 frame 56 and determines that the layer 2 frame 56 comprises a TCP open connection request based on the TCP header having the SYN flag 66 set to a value of true, and that the layer 2 frame 56 is destined for the network gateway router 16 based on the destination MAC address field 58. The bridged gateway 24 accesses the source MAC address table 48. The bridged gateway 24 determines that the entry 50-1 corresponds to the computing device 26-1. In response to determining that the layer 2 frame is destined for the network gateway router 16 and that the layer 2 frame comprises a TCP open connection request, the bridged gateway 24 starts a timer 68 that corresponds to the computing device 26-1. The timer 68 may be set to expire after any desired interval of time, such as 10 milliseconds (ms), 50 ms, 500 ms, 1000 ms, or the like. In one embodiment, the bridged gateway 24 may also store information 70 that identifies the server 52. Such information may comprise, for example, the IP address of the server 52, or the domain name of the server 52.

The bridged gateway 24 generates an encapsulated layer 2 frame 72 that encapsulates the layer 2 frame 56 in accordance with the tunneling protocol that implements the tunnel 36, and sends the encapsulated layer 2 frame 72 to the network gateway router 16. In some embodiments the bridged gateway 24 may start the timer 68 after the encapsulated layer 2 frame 72 is sent to the network gateway router 16. The network gateway router 16 receives the encapsulated layer 2 frame 72, extracts the layer 2 frame 56 from the encapsulated layer 2 frame 72, and determines that the layer 2 frame 56 comprises a TCP/IP packet destined for the server 52 that is off the local subnet 14.

The network gateway router 16 determines a next hop address of a next hop router in the path of routers between the network gateway router 16 and the server 52, addresses the TCP/IP packet to the next hop router, and communicates the TCP/IP packet to the next hop router.

Subsequently, the network gateway router 16 receives a response packet from the server 52, determines that the response packet is destined for the computing device 26-1, and generates an encapsulated layer 2 frame in accordance with the tunneling protocol that implements the tunnel 36 that has a destination address of the computing device 26-1. The bridged gateway 24 receives the encapsulated layer 2 frame, and determines that the layer 2 frame is destined for the computing device 26-1. The timer 68 has not yet expired, and the bridged gateway 24 turns off the timer 68 and forwards the layer 2 frame to the computing device 26-1.

Assume for purposes of illustration that a different sequence of events had occurred rather than that described above. In this example, after the bridged gateway 24 started the timer 68 and sent the encapsulated layer 2 frame 72 to the network gateway router 16, the timer 68 elapses. Because the bridged gateway 24 would have turned off the timer 68 if a response for the computing device 26-1 had been received by the bridged gateway 24, the bridged gateway 24 determines that no response has been received from the computing device 26-1. The failure to receive a response may be for any number of reasons, including, for example, a problem with the server 52, the network gateway router 16, any intervening devices 46, or problems with cables or other communications media that connect any such devices. The bridged gateway 24 generates an alert that indicates that the computing device 26-1 has not received a response, and sends the alert to a destination, such as an operator computing device 74. The alert may also include, for example, the information 70 that identifies the server 52.

In another embodiment, the bridged gateway 24, prior to sending an alert, may maintain a counter 76 that must reach a predetermined value before the bridged gateway 24 sends an alert. As an example, the bridged gateway 24 may start the timer 68 and send the encapsulated layer 2 frame 72 to the network gateway router 16. Subsequently, the timer 68 elapses. The bridged gateway 24 increments the counter 76 and determines that the value of the counter is below an alert threshold, such as 2. After a period of time the computing device 26-1 retries to establish a connection with the server 52 by generating another layer 2 frame identical to the layer 2 frame 56 and transmits the layer 2 frame onto the local subnet 14.

The bridged gateway 24 receives the layer 2 frame. The bridged gateway 24 analyzes the layer 2 frame and determines that the layer 2 frame comprises a TCP open connection request based on the TCP header having the SYN flag 66 set to a value of true, and that the layer 2 frame is destined for the network gateway router 16. The bridged gateway 24 accesses the source MAC address table 48. The bridged gateway 24 determines that the entry 50-1 corresponds to the computing device 26-1. In response to determining that the layer 2 frame is destined for the network gateway router 16 and that the layer 2 frame comprises a TCP open connection request, the bridged gateway 24 starts the timer 68 that corresponds to the computing device 26-1.

Subsequently, the timer 68 elapses. The bridged gateway 24 increments the counter 76 and determines that the value of the counter is now 2 and thus at the alert threshold. In response, the bridged gateway 24 generates an alert that indicates that the computing device 26-1 has not received a response, and sends the alert to the operator computing device 74.

To communicate with the computing device 26-2, the computing device 26-1 may generate a layer 2 frame address to the MAC address of the computing device 26-2 (i.e., 336733), and transmit the layer 2 frame onto the subnet 14. The bridged gateway 24 receives the layer 2 frame and determines that the layer 2 frame is destined for the computing device 26-2 and thus need not be sent to the network gateway router 16 via the tunnel 36. The bridged gateway 24 sends the layer 2 frame to the computing device 26-2.

As discussed above, in some embodiments the bridged gateway 24 may determine whether only certain types of layer 2 frames communicated to the network gateway router 16 are responded to, such as only TCP open connection requests. In other embodiments, the bridged gateway 24 may determine whether any layer 2 frame communicated to the network gateway router 16 is responded to, or may have multiple criteria to select different types of layer 2 frames.

Figure 2:
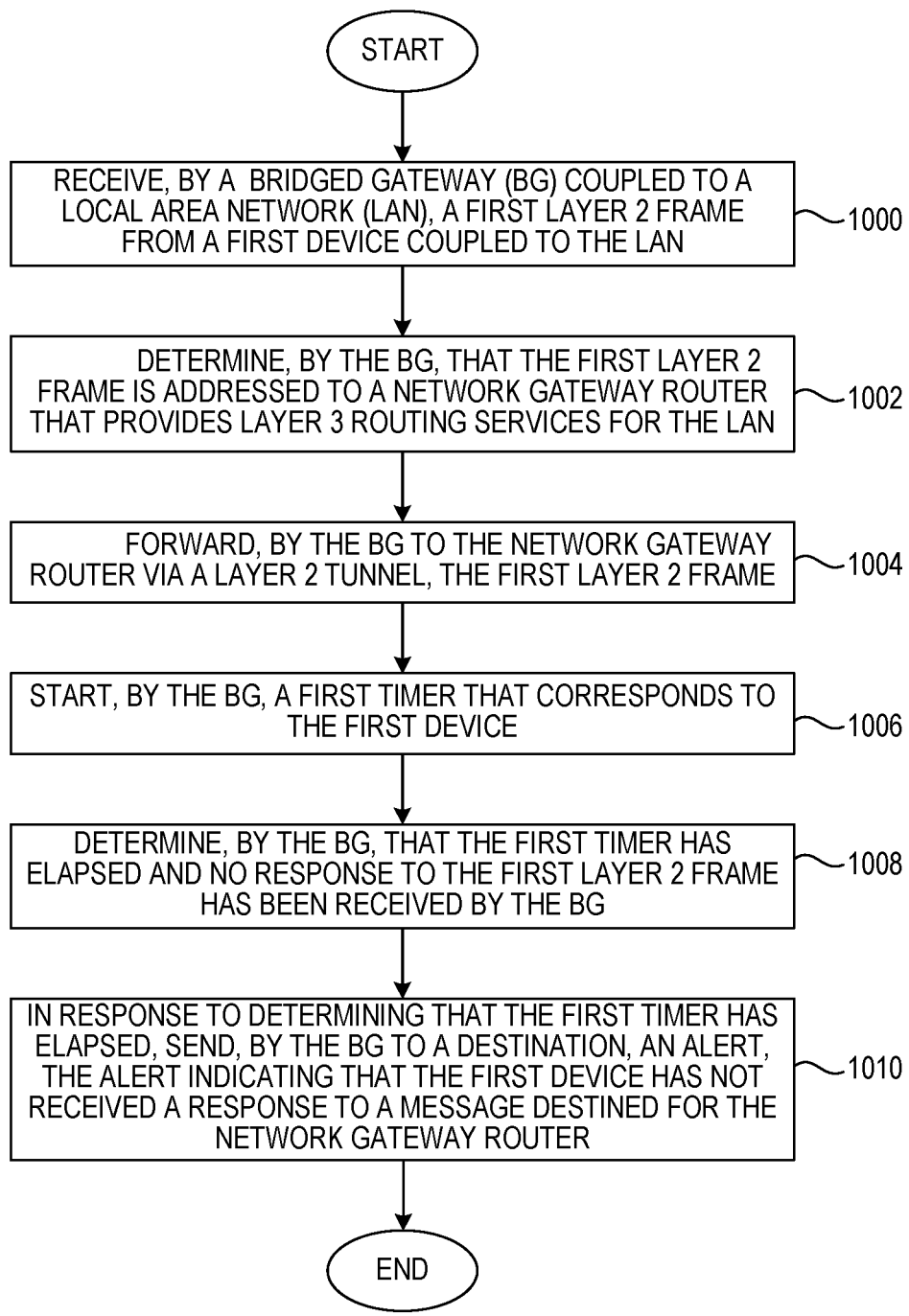
FIG. 2 is a flowchart of a method for implementing LAN-connected device status determination by a bridged gateway according to one embodiment.

FIG. 2 is a flowchart of a method for implementing LAN-connected device status determination by the bridged gateway 24 according to one embodiment. FIG. 2 will be discussed in conjunction with FIG. 1. The bridged gateway 24, coupled to the LAN 14, receives the layer 2 frame 56 from the computing device 26-1 (FIG. 2, block 1000). The bridged gateway 24 determines that the layer 2 frame 56 is addressed to the network gateway router 16 that provides layer 3 routing services for the LAN 14 (FIG. 2, block 1002). The bridged gateway 24 forwards, to the network gateway router 16 via the layer 2 tunnel 36, the layer 2 frame 56 (FIG. 2, block 1004). The bridged gateway 24 starts the timer 68 that corresponds to the computing device 26-1 (FIG. 2, block 1006). The bridged gateway 24 determines that the timer 68 has elapsed and no response to the layer 2 frame 56 has been received by the bridged gateway 24 (FIG. 2, block 1008). The bridged gateway 24, in response to determining that the timer 68 has elapsed, sends, to a destination, an alert, the alert indicating that the computing device 26-1 has not received a response to a message destined for the network gateway router 16 (FIG. 2, block 1010).

Figure 3:
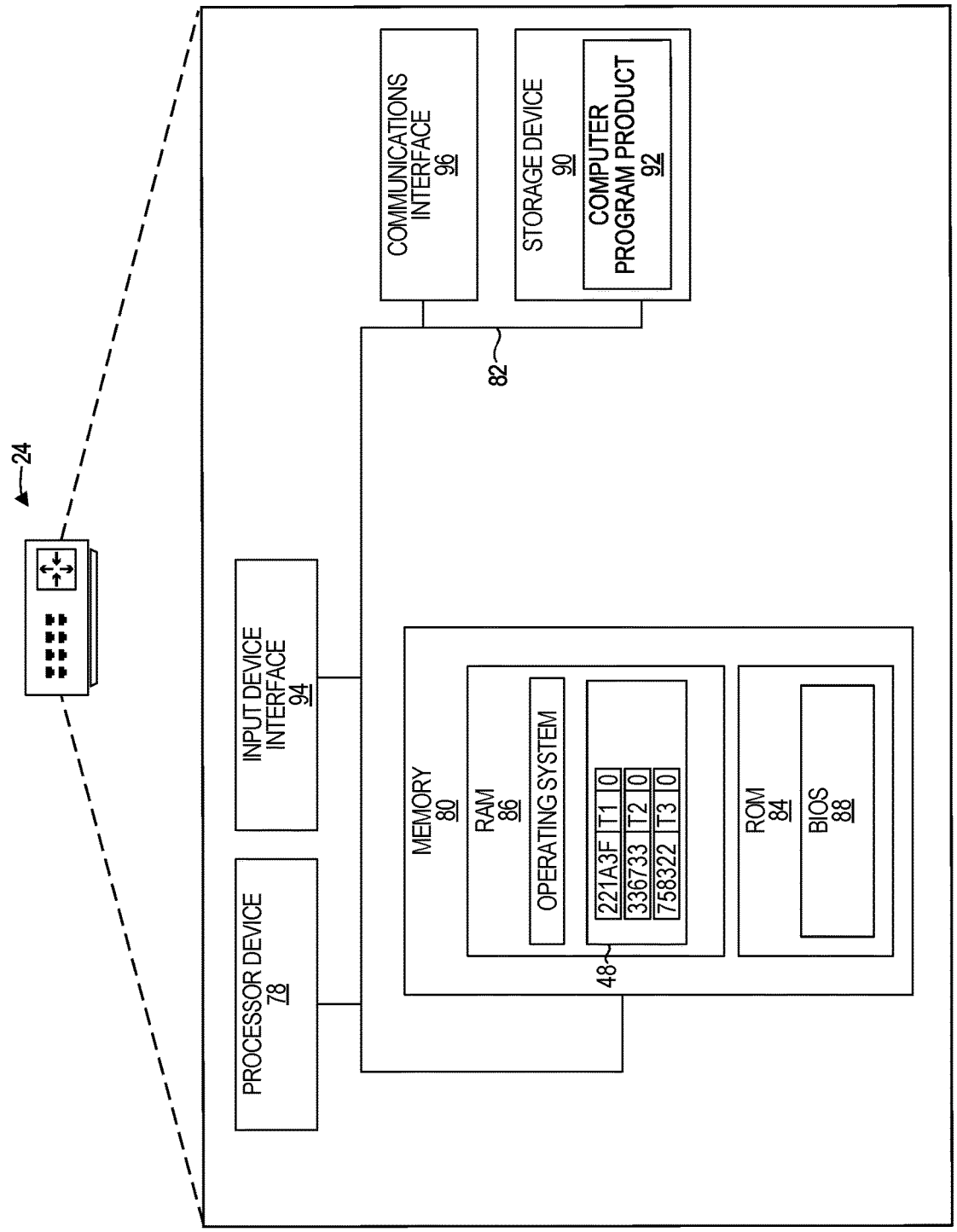
FIG. 3 is a block diagram of a bridged gateway according to one embodiment.

FIG. 3 is a block diagram of the bridged gateway 24 suitable for implementing examples according to one example. The bridged gateway 24 includes a processor device 78, a system memory 80, and a system bus 82. The system bus 82 provides an interface for system components including, but not limited to, the system memory 80 and the processor device 78. The processor device 78 can be any commercially available or proprietary processor device.

The system bus 82 may be any of several types of bus structures that may further interconnect to a memory bus (with or without a memory controller), a peripheral bus, and/or a local bus using any of a variety of commercially available bus architectures. The system memory 80 may include non-volatile memory 84 (e.g., read-only memory (ROM), erasable programmable read-only memory (EPROM), electrically erasable programmable read-only memory (EEPROM), etc.), and volatile memory 86 (e.g., random-access memory (RAM)). A basic input/output system (BIOS) 88 may be stored in the non-volatile memory 84 and can include the basic routines that help to transfer information between elements within the bridged gateway 24. The volatile memory 86 may also include a high-speed RAM, such as static RAM, for caching data.

The bridged gateway 24 may further include or be coupled to a non-transitory computer-readable storage medium such as a storage device 90, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 90 and other drives associated with computer-readable media and computer-usable media may provide non-volatile storage of data, data structures, computer-executable instructions, and the like.

A number of modules can be stored in the storage device 90 and in the volatile memory 86, including an operating system and one or more program modules, which may implement the functionality described herein in whole or in part. All or a portion of the examples may be implemented as a computer program product 92 stored on a transitory or non-transitory computer-usable or computer-readable storage medium, such as the storage device 90, which includes complex programming instructions, such as complex computer-readable program code, to cause the processor device 78 to carry out the steps described herein. Thus, the computer-readable program code can comprise software instructions for implementing the functionality of the examples described herein when executed on the processor device 78.

An operator may also be able to enter one or more configuration commands through a keyboard (not illustrated), a pointing device such as a mouse (not illustrated), or a touch-sensitive surface such as a display device. Such input devices may be connected to the processor device 78 through an input device interface 94 that is coupled to the system bus 82 but can be connected by other interfaces such as a parallel port, an Institute of Electrical and Electronic Engineers (IEEE) 1394 serial port, a Universal Serial Bus (USB) port, an IR interface, and the like. The bridged gateway 24 may also include a communications interface 96 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method, comprising:
receiving, by a bridged gateway (BG) coupled to a local area network (LAN), a first layer 2 frame from a first device coupled to the LAN;
determining, by the BG, that the first layer 2 frame is addressed to a network gateway router that provides layer 3 routing services for the LAN;
forwarding, by the BG to the network gateway router via a layer 2 tunnel, the first layer 2 frame;
starting, by the BG, a first timer that corresponds to the first device;
determining, by the BG, that the first timer has elapsed and no response to the first layer 2 frame has been received by the BG; and
in response to determining that the first timer has elapsed, sending, by the BG to a destination, an alert, the alert indicating that the first device has not received a response to a message destined for the network gateway router.

2. The method of claim 1, further comprising:
prior to starting the first timer that corresponds to the first device:
determining, by the BG, that the first layer 2 frame comprises a request to a server to open a transmission control protocol (TCP) connection with the server; and
and in response to determining that the first layer 2 frame comprises the request to the server to open the TCP connection, starting, by the BG, the first timer that corresponds to the first device.

3. The method of claim 2 wherein determining, by the BG, that the first layer 2 frame comprises the request to open the TCP connection with the server comprises:
determining, by the BG, that the first layer 2 frame comprises a TCP packet having a synchronize (SYN) flag set to a value of true.

4. The method of claim 2 further comprising storing, by the BG, information that identifies the server, and wherein the alert identifies the server.

5. The method of claim 1 further comprising:
prior to sending the alert, incrementing, by the BG, a counter;
repeatedly, by the BG until the counter has a value that meets an alert threshold:
receiving, by the BG, a layer 2 frame from the first device;
determining, by the BG, that the layer 2 frame is addressed to the network gateway router;
forwarding, by the BG to the network gateway router via the layer 2 tunnel, the layer 2 frame;
incrementing the counter;
starting, by the BG, the first timer that corresponds to the first device; and
determining, by the BG, that the first timer has elapsed; and
in response to the counter having the value that meets the alert threshold, sending, by the BG to the destination, the alert.

6. The method of claim 1, further comprising:
receiving, by the BG, a second layer 2 frame from a second device coupled to the LAN;
determining, by the BG, that the second layer 2 frame is addressed to the network gateway router;
forwarding, by the BG to the network gateway router via the layer 2 tunnel, the second layer 2 frame;
starting, by the BG, a second timer that corresponds to the second device;
prior to the second timer expiring, receiving, by the BG, a third layer 2 frame from the network gateway router via the layer 2 tunnel;
determining, by the BG, that the third layer 2 frame is addressed to the second device; and
in response to determining that the third layer 2 frame is addressed to the second device, turning off the second timer and inhibiting sending an alert indicating that the second device has not received a response to the message destined for the network gateway router.

7. The method of claim 1, further comprising:
receiving, by the BG, a second layer 2 frame from the first device;
determining, by the BG, that the second layer 2 frame is addressed to a second device coupled to the LAN; and
sending, by the BG to the second device, the second layer 2 frame without sending the second layer 2 frame via the layer 2 tunnel.

8. The method of claim 1 wherein the layer 2 tunnel comprises a Generic Routing Encapsulation tunnel.

9. The method of claim 1 further comprising:
prior to forwarding the first layer 2 frame to the network gateway router via the layer 2 tunnel, encapsulating, by the BG, the first layer 2 frame using a layer 2 tunnel encapsulation protocol.

10. The method of claim 1 wherein the network gateway router is not physically coupled to the LAN.

11. The method of claim 1 further comprising:
prior to receiving the first layer 2 frame from the first device, receiving, by the BG from the first device, a previous layer 2 frame comprising a DHCPDISCOVER message addressed to a broadcast address;
forwarding, by the BG to the network gateway router via the layer 2 tunnel, the previous layer 2 frame;
subsequently receiving, by the BG from the network gateway router via the layer 2 tunnel, a DHCPOFFER message addressed to a media access control (MAC) address of the first device; and
sending, by the BG to the first device, the DHCPOFFER message.

12. A bridged gateway, comprising:
a memory; and
a processor device coupled to the memory configured to:
receive a first layer 2 frame from a first device coupled to a local area network (LAN);
determine that the first layer 2 frame is addressed to a network gateway router that provides layer 3 routing services for the LAN;
forward, to the network gateway router via a layer 2 tunnel, the first layer 2 frame;
start a first timer that corresponds to the first device;
determine that the first timer has elapsed and no response to the first layer 2 frame has been received; and
in response to determining that the first timer has elapsed, send, to a destination, an alert, the alert indicating that the first device has not received a response to a message destined for the network gateway router.

13. The bridged gateway of claim 12, wherein the processor device is further configured to:
prior to starting the first timer that corresponds to the first device:
determine that the first layer 2 frame comprises a request to a server to open a TCP connection with the server; and
and in response to determining that the first layer 2 frame comprises the request to open the TCP connection, start the first timer that corresponds to the first device.

14. The bridged gateway of claim 12, wherein the processor device is further configured to:
prior to sending the alert, increment a counter;
repeatedly, until the counter has a value that meets an alert threshold:
receive a layer 2 frame from the first device;
determine that the layer 2 frame is addressed to the network gateway router;
forward, to the network gateway router via the layer 2 tunnel, the layer 2 frame;
increment the counter;
start the first timer that corresponds to the first device; and
determine that the first timer has elapsed and no response to the layer 2 frame has been received by the BG from the network gateway router; and
in response to the counter having the value that meets the alert threshold, send, to the destination, the alert.

15. The bridged gateway of claim 12, wherein the processor device is further configured to:
prior to forwarding the first layer 2 frame to the network gateway router via the layer 2 tunnel, encapsulate the first layer 2 frame using a layer 2 tunnel encapsulation protocol.

16. The bridged gateway of claim 12, wherein the processor device is further configured to:
prior to receiving the first layer 2 frame from the first device, receive, from the first device, a previous layer 2 frame comprising a DHCPDISCOVER message addressed to a broadcast address;
forward, to the network gateway router via the layer 2 tunnel, the previous layer 2 frame;

subsequently receive, from the network gateway router via the layer 2 tunnel, a DHCPOFFER message addressed to a media access control (MAC) address of the first device; and send, to the first device, the DHCPOFFER message.

17. A non-transitory computer-readable storage medium that includes executable instructions configured to cause a processor device to:

receive a first layer 2 frame from a first device coupled to a local area network (LAN);

determine that the first layer 2 frame is addressed to a network gateway router that provides layer 3 routing services for the LAN;

forward, to the network gateway router via a layer 2 tunnel, the first layer 2 frame;

start a first timer that corresponds to the first device;

determine that the first timer has elapsed and no response to the first layer 2 frame has been received; and in response to determining that the first timer has elapsed, send, to a destination, an alert, the alert indicating that the first device has not received a response to a message destined for the network gateway router.

18. The non-transitory computer-readable storage medium of claim 17, wherein the instructions further cause the processor device to:

prior to starting the first timer that corresponds to the first device:

determine that the first layer 2 frame comprises a request to a server to open a TCP connection with the server; and and in response to determining that the first layer 2 frame comprises the request to open the TCP connection, start the first timer that corresponds to the first device.

19. The non-transitory computer-readable storage medium of claim 17, wherein the instructions further cause the processor device to:

prior to sending the alert, increment a counter;

repeatedly, until the counter has a value that meets an alert threshold:

receive a layer 2 frame from the first device;

determine that the layer 2 frame is addressed to the network gateway router;

forward, to the network gateway router via the layer 2 tunnel, the layer 2 frame;

increment the counter;

start the first timer that corresponds to the first device; and determine that the first timer has elapsed and no response to the layer 2 frame has been received from the network gateway router; and in response to the counter having the value that meets the alert threshold, send, to the destination, the alert.

20. The non-transitory computer-readable storage medium of claim 17, wherein the instructions further cause the processor device to:

prior to forwarding the first layer 2 frame to the network gateway router via the layer 2 tunnel, encapsulate the first layer 2 frame using a layer 2 tunnel encapsulation protocol.

* * * * *